United States Patent Office 3,806,330
Patented Apr. 23, 1974

3,806,330
APPARATUS FOR TREATMENT OF GLASS SHEETS
Michel Martin, Soisy-sous-Montmorency, France, assignor to Saint-Gobain Industries, Neuilly-sur-Seine, France
Original application Mar. 24, 1969, Ser. No. 827,436, now Patent No. 3,677,731. Divided and this application Mar. 28, 1972, Ser. No. 238,861
Claims priority, application France, Mar. 26, 1968, 145,470; Mar. 24, 1969, 827,436
Int. Cl. C03b 23/02
U.S. Cl. 65—158   1 Claim

ABSTRACT OF THE DISCLOSURE

Method of, and article produced by suspending a sheet or lamina of glass vertically, by placing the sheet within a flat sack of refractory fabric, suspending the sheet by supporting the sack at or along its upper edge while heating it to a desired or softening temperature. After heating, the sheet suspended by its sack is transported to a position between opposing press platens, which are then forced together to temper the sheet and/or to conform it to the shape of the platens. Both platens may be rigid and complementally curved. Or one platen may be of rigid convexly curved form and the other a vertically disposed hammock of refractory fabric yieldingly stretched and operable to force the heated sheet into conformity with the rigid platen. The invention is of particular utility in the production of laminated glass sheets as for automobile windshields, wherein the rigid platen may be a first lamina previously shaped and tempered, and the second untempered lamina, originally flat, heated and suspended within its sack, is pressed against the rigid platen and is shaped thereby, then removed from the sack and adhesively secured to the first lamina, to complete the laminated sheet.

---

This application is a division of application Ser. No. 827,436, filed Mar. 24, 1969, now Pat. No. 3,677,731.

This invention relates to a method of fabrication by which sheets of glass may be facilely shaped and/or tempered, or otherwise heat treated by suspending each sheet within a sack of refractory fabric, heating the sheet to softening or tempering temperature, and shaping and/or tempering the sheet while still suspended vertically within its sack.

It is the chief object to provide a method by which sheets of glass may be treated while suspended vertically by and within a sack of refractory fabric material.

Another object is to provide a method as aforesaid, by which are obviated the highly undesirable markings on, or marring of the sheets otherwise unavoidable when, as in the prior art, they must be gripped at and along one or more edges by suspension clamps or pincers during heat treatment.

Still another object is to provide a method as aforesaid by which laminated glass sheets may be inexpensively produced, in which one lamina of the composite sheet is tempered and the other is untempered.

Yet another object is to provide a method as in the immediately preceding object, wherein a previously shaped, tempered and rigid first lamina may be used as a platen for shaping a second and untempered lamina, and the two laminae subsequently adhesively secured together to form a completed composite sheet.

A further object is to provide a method wherein glass sheets may be facilely tempered to afford an excellent and highly satisfactory fragmentation, as in automobile windshields and windows.

Still another object is to provide a method as aforesaid by which a sheet of glass may be heated to softening temperature while suspended vertically by and within a sack of refractory fabric material, transported within its sack to a position between shaping and/or tempering platens, and there immediately shaped and tempered by pressing between opposed platens while still suspended within its sack, so that gripping of the sheet along its edges by mechanical clamps or pincers, and the resulting inevitable marring of the sheet thereby, are avoided.

Another object and advantage inherent in the procedure described in the immediately preceding object, is a method by which a sheet of glass heated to a plasticity and suspended by and within its sack, may be facilely and rapidly shaped by and between a first rigid platen having a convexly curved shaping surface, and a second platen of yieldingly stretched refractory fabric which operates to force the hot plastic glass sheet into conformity with the surface of the rigid platen.

A still further object is to provide an improved method of heat treatment of glass sheets wherein the heated sheet is protected in its enclosing sack during transport from heating means to the place of shaping and/or tempering, so that the rate of cooling during transport is minimized and a much more precise and accurate control of temperature of the sheet is afforded.

Yet another object is to provide a method wherein sheets of glass, single or laminated, may be produced, which are free and clear of markings at and along their edges, or elsewhere, in a rapid production line procedure, at minimum cost and, when desired, having highly satisfactory fragmentation as the result of complete and uniform tempering.

The invention also relates to the sheets produced by the aforesaid method.

Other objects and advantages will become obvious to those skilled in the art, after a study of the following detailed description and the accompanying drawing.

Briefly, the method consists in placing each sheet of glass within a bag or sack of heat resistant or refractory fabric, and in positioning the sheet, suspended by and within its sack, in a furnace. When the sheet so suspended has attained the softening temperature required for its processing, it is extracted from the furnace and moved, still within its sack, to a location where it is shaped and/or tempered as by pressing it against a solid platen having the desired final shape or form to be imparted to the sheet.

The procedure has numerous advantages. One of the more important of these is that the sheet, being suspended entirely by and within its sack during heating within the furnace, and its subsequent treatment, is kept free of scuff marks or other imperfections otherwise unavoidably present, as in those instances where, for example, the sheet is conventionally gripped at and along its edge portions and is thus suspended by and between mechanical clamping or pincer means. This advantage is of particular importance in connection with small glass articles such as looking glasses, lamp lenses and similar articles which cannot be supported within mounting means, rims or bezels to a degree or depth sufficient to hide or obscure the marks inherently formed by mechanical clamping or pincer means as aforesaid.

Another major advantage is that the sack of fibrous refractory material in which each of the articles is enclosed and by which it is suspended or supported in vertical position, protects the article against premature excessive cooling from the time it is withdrawn from the furnace or like heating means, until it is moved and positioned at the place where it is to be shaped or otherwise treated. This advantage is of particular utility and significance in connection with glass sheets of small dimensions or thickness, and which by reason of their low mass, will otherwise inherently cool at a particularly rapid rate.

Another advantage resides in the fact that the apparatus is relatively simple in construction and in some instances may save the cost of a second rigid shaped die or platen. Operation is particularly facile because the glass article is simply inserted into one of the sacks, in contradistinction to the relatively complicated and crucial prior art procedure wherein it must be gripped at and along its upper edge, by and between clamps or pincer means.

A very useful application of the invention is in the shaping of sheets of glass, in particular, of sheets which are exceptionally thin, with a thickness of 1 to 2 mm. or even less. In prior art procedures such thin glass sheets could not be easily shaped by heating upon a frame imparted the correct shape to the sheet at and along its periphery, the thinness of the glass made it impossible to control with a sufficient or satisfactory degree of precision, the deflection or sagging of the sheet over its central region. In order to avoid this drawback in the prior art, it was necessary to use a fully shaped platen or form capable of supporting the glass sheet over its entire area after being shaped or pressed. But this introduced further difficulties because it was necessary to heat the platen or form over its entire area, to the same temperature as that of the softened sheet. This further complicated and increased costs of production due to the thermal inertia of the platen. It also unavoidably increased the time of treatment. Further, before the shaped sheet could be removed from its form of platen it had to be cooled; and this further prolonged the procedure because the platen had relatively great mass. There was also a significant loss of heat energy.

In contrast, by the present invention it is possible to effect shaping of the sheet while it is suspended in a vertical position. This is effected between a platen or mold and an opposing surface which remains cool and which is forced against the platen after the sack containing a heated glass sheet or article, has been introduced between the platen and the opposing surface or pressing means.

Where simple curves are being pressed into the heated sheet, that is to say, where the final shape of the sheet does not have violent or abrupt changes of shape, or is curved in a single plane only, a shaped platen may be employed and the opposing press surface may be merely a flexible sheet of fibrous refractory fabric or textile yieldingly stretched and mounted upon a rigid frame so that it may conform to the shape of the platen as the two are pressed together with interposed bag or sack and its contained heated sheet.

Another important feature of the invention is tempering of the glass sheet by contact, that is, by heat conduction. In such use the sheet, supported in and by its sack of refractory fabric, is withdrawn from the furnace and positioned between two rigid complementally shaped, cooled platens or forms. These are forced together against respective surfaces of the sheet and effect the rapid cooling and tempering thereof. The degree of tempering will be regulated in accordance with the thickness of the sheet and the temperature to which it is heated, not only by varying the intensity or rate of cooling of the platens or press forms, but also be selection of the thickness of the fabric of the sack and, possibly, by fibrous supplemental sheets of heat-resistant material applied over the cooling or press platens.

The fact that the heated sheet when withdrawn from the furnace, is encased within its sack and thereby protected against excessive and premature cooling is very important in the ensuing tempering because this assures a more facile, accurate and precise control of temperature than in the prior art wherein the sheet, immediately on withdrawal from the furnace, is subject to uncontrollable cooling by conduction and radiation, especially where the article or sheet is small or particularly thin.

The aforesaid sacks or bags within which the glass sheets or articles are contained and by which they are supported, may be a textile of mineral fiber, for example, glass or silica fibers, or metal filaments. The thickness of the fabric or textile depends upon several factors, such, for example, as the weight of the glass sheets to be treated, their thickness, and in event of tempering, the desired intensity or rate of cooling. As an example, where the sacks are of silica, glass, or steel fibers, the thickness of the textile of which they are formed, may be from 0.03 to 0.5 mm.

In some uses it is sufficient to form the bags or sacks simply by folding a single sheet of the fabric. But to avoid excessive stretching of the fabric along the creases or edges of the sack, I have found that it is preferable, especially where the sack is of glass fibers, to employ two parallel superposed sheets of the fabric, secured together along their lower edge by a seam or metal clips or binding. This is adequate for thin glass sheets of 3 mm. or less, thickness. For glass sheets of greater thickness it is advisable to interpose between the two pieces of sheets of fabric, along their superposed lower edges, a band or strip having a thickness about the same as the sheet to be treated. This avoids too short a radius of curvature of the refractory fibers of the sack, at and along the lower border where they would otherwise be bent around the lower edge of the sheet treated. For example, the interposed strip may be formed of several superposed thickness of fabric of the same material as the sack itself.

Precise positioning of the glass sheet with respect to the shaping forms or means, is assured, first by the suspension mechanism of the supporting sack, which mechanism elevates the sack to a predetermined height after its extraction from the furnace, secondly by marks or indicia affixed to the exterior surface of the sack.

Advantageously the sheet to be treated is inserted into the sack through that one of its vertical or side edges which is not stitched or otherwise obturated.

The invention will be readily understood by reference to the accompanying drawing, in connection with the detailed description disclosing examples of apparatus for carrying out the method by shaping a sheet of glass by pressing.

Figure 1:
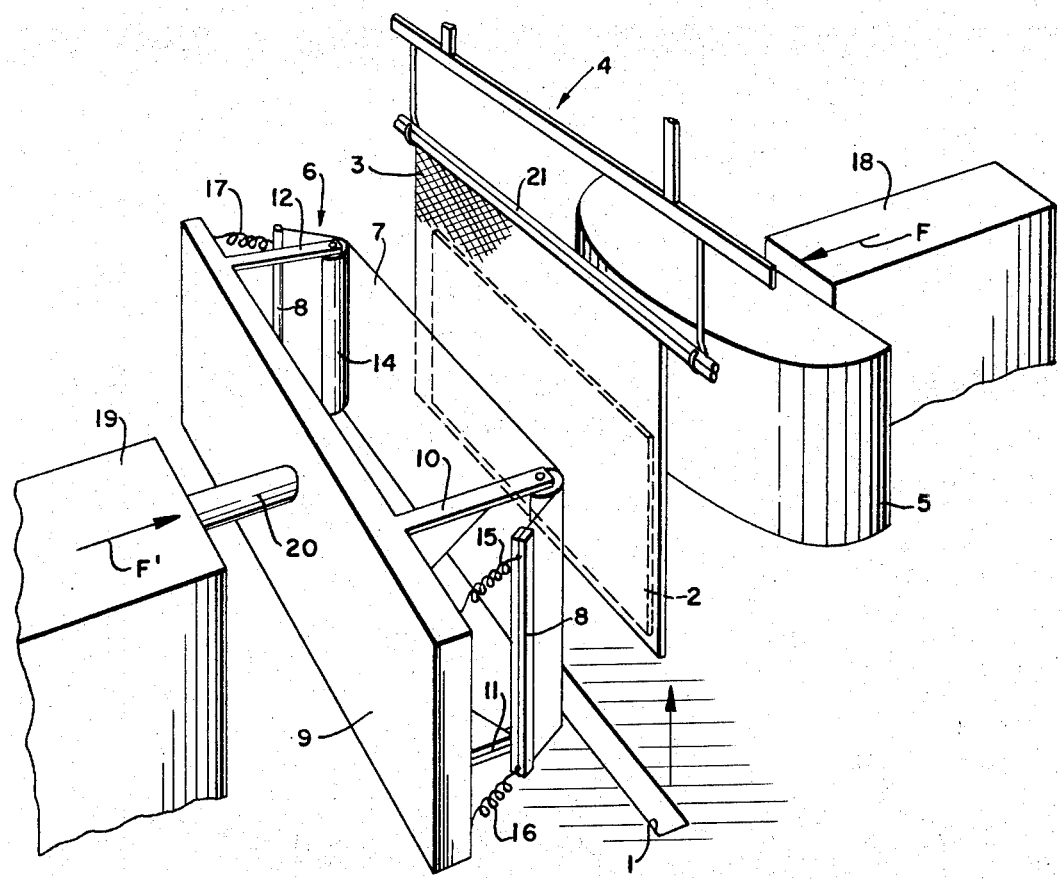
FIG. 1 is a perspective schematic view of one form of apparatus for carrying out the invention by pressing a sheet of glass into desired form or shape.

Referring in detail to FIG. 1, a furnace has a slot 1 in its roof, through which each sheet and its supporting sack may be inserted and withdrawn. The sheet of glass 2, to be shaped and/or tempered, is positioned within its fabric sack 3 and is supported in vertical position by appropriate mechanism generally indicated at 4, and by which the assembled sack and sheet may be lowered through slot 1 into the furnace and when heated to proper temperature, withdrawn therefrom.

As shown, the sheet and its sack are suspended between a rigid convex mold or platen 5, and a flexible pressing means generally identified at 6, and consisting of a flexible sheet or fabric, or hammock 7 of fibrous refractory or heat-resisting material having each of its vertical edges reinforced by clamping between a respective pair of strips or binding, as clearly indicated at 8, FIG. 1. A rigid mounting plate or frame 9 has two pairs, right and left, or forwardly projecting rigid arms such as those indicated at 10 and 11, right, FIG. 1. Of the left pair, only the upper one 12 appears in the figure.

Each pair of arms journals between its ends, a respective one of two rollers 13, right, and 14, left. Hammock 7 passes over and about these rollers and is yieldingly stretched by pairs of springs 15, 16 each connected at one end with a corresponding one of reinforcement 8, and at its other end with plate or frame 9. Only the upper one of the two springs at the left is shown and identified at 17.

Platen 5 is mounted by hydraulic or pneumatic force-exerting means 18, for horizontal translation in the direction of arrow F, FIG. 1. Likewise the force-exerting assembly 6 including plate 9 and all parts carried thereby, are mounted by similar means 19 including press plunger 20, for horiozntal translation in the direction indicated by arrow F', which direction is, of course, aligned and coincident with direction F. The forces exerted are capable of being regulated by means which are conventional and hence not shown.

In operation of this form of the invention, a sheet of glass 2 to be shaped, is inserted through one unobturated vertical side edge of a sack 3, and disposed with its lower edge adjacent or in contact with the lower seam or fold of the sack and which, of course, is closed as aforesaid, by stitching or metal binding. The sack, along its upper edge is clamped or otherwise suitably secured to a metal bar 21 and thereby suspended in vertical position over slot 1 of the furnace. The sack and its glass sheet are lowered into the furnace by mechanism 4 and suspended therein until the sheet has attained the desired softening temperature. Then the sack and sheet are elevated out of the furnace to about the position shown, FIG. 1, whereupon pressure 18 and 19 are simultaneously energized to press the glass sheet 2 between platen 5 and flexible stretched sheet 7. Due to its yielding mounting, hammock 7 in effect wraps about sheet 2 as the latter bends to conform with the shape of rigid platen 5.

The shaped sheet is held in position between platen 5 and hammock 7 until it has cooled sufficiently to maintain its form and to enable extraction from the sack.

In the form shown upon FIG. 1 the suspension bar 21 is straight and rigid. This suffices in those situations wherein the final curvature to be imparted to sheet 2 is not too pronounced or abrupt. In other situations however, the means suspending the sack and its contained sheet may have a degree of flexibility sufficient to enable it to flex with the sheet as the latter conforms to platen 5.

In FIG. 1, hammock 7 is flexible but plane. It is capable of conforming to platen 5, not only when the latter is, as shown, curved only in horizontal planes, but also be a limited extent when the form is also curved in vertical planes parallel with the direction of translation of the platen such, for example, as a horizontal offset of 20 to 30 mm. in a vertical distance of 50 to 60 cm. If the platen has a shape involving more pronounced or abrupt curvatures in the aforesaid vertical planes, it is possible to employ a hammock such as 7, which is simply supported by yielding of resilient means such as springs carried at their ends by a rigid frame, and attached at their other ends to the four corners, or along the four edges of the hammock.

When the shape to be imparted to the glass sheet is complex, that is, has portions involving short radii of curvature or inflection points, it is not practicable to use a hammock such as 7, because the latter will not conform the sheet closely to the shape of the solid or rigid platen. In such cases it is possible to substitute for the hammock, a rigid female form shaped to conform closely to the form of platen 5. Such a modification is depicted upon FIG. 2.

Figure 2:
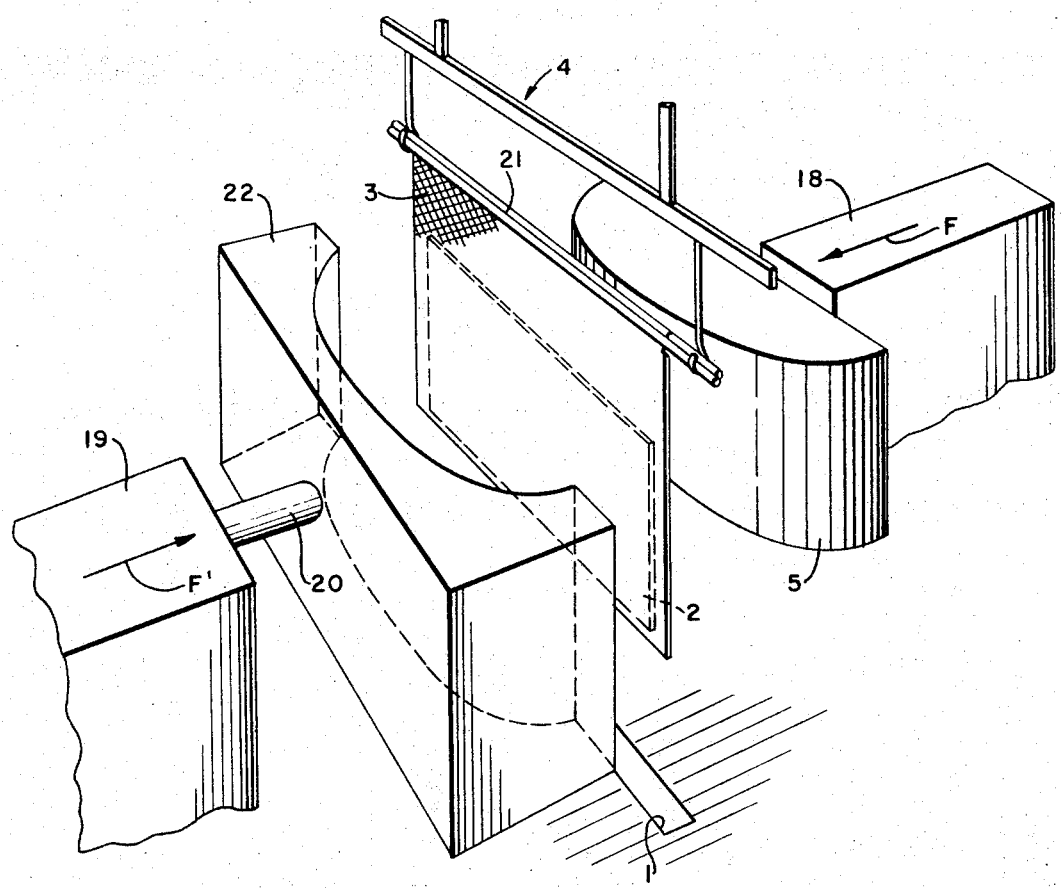
FIG. 2 is a perspective view like FIG. 1, of another form of apparatus for carrying out the new method.

In FIG. 2 the same numerals have been used to identify identical parts shown upon FIG. 1, so that these need not be redescribed and it is sufficient to point out glass sheet 2, its supporting sack 3, elevating and suspending means 4, and rigid platen 5. However, unlike the set-up of FIG. 1, press plunger 20 carries a rigid female platen 22 of metal of refractory material, shaped complementary to that of platen 5 so that whenthe two are pressed together they conjoint shape the plastic sheet to the desired form, even though that involves curvature in mutually normal planes extending parallel with the direction of movement of the platens.

In some of the examples which follow, the sheet heated to plasticity is shaped over a rigid platen of metal or of refractory material. But it is equally feasible to use platens of other materials. In particular it is satisfactory to use platens of shaped glass sheets. Such a procedure is of particular interest as subsequently described, in the production of sheets of superposed laminae of shaped glass wherein one of the lamina is to be tempered.

In the prior art fabrication of shaped laminated sheets the laminae are assembled and secured together by means of an interposed layer or coating such as polyvinyl butyral. The lamina are necessarily of precisely the same curvature. To obtain the desired result it is usual in the fabrication of ordinary laminated glass sheets, to superpose the two laminae to be connected together, on a platen of the desired shape and to heat them in a furnace to softening temperature until they conform to the shape of the platen. But this procedure has the great drawback previously mentioned, regarding thermal inertia, that it cannot be used when one of the laminae to be connected together must be of tempered glass, because the reheating to connect the laminate destroys the previous tempering of the one lamina.

The production of laminated glass sheets wherein one of the laminae is tempered can be readily effected in accordance with the present invention, by using as the form or platen for the untempered lamina, a second lamina previously shaped and tempered and which remains cool during the shaping of the first lamina, so that its temper is not drawn or lost.

The lamina first shaped and tempered serves as the platen or form and, for this purpose is gripped in vertical position by and between abutments which are preferably rubber-tipped and which contact its concave face. Then a flexible hammock of refractory fabric, such as 7, FIG. 1, yieldingly stretched and carried by a rigid frame is used to press the hot, untempered lamina into surface contact with and conformation to the cool rigid tempered lamina. Otherwise the procedure is exactly like that previously described. Experiments show that laminated glass sheets may be thus fabricated with highly satisfactory precision, wherein the previously shaped and tempered lamina forms a platen for the shaping of the untempered lamina. The method is especially valuable in the production of automobile windshields and windows where the laminated sheet or pane is installed with its tempered side inside the vehicle and the untempered side faces outwardly. The windshield is thus effective in forming a protection against injury to occupants of the vehicle otherwise possible as the result of fragments of glass shattered in a collision.

In order to decrease the total or over-all weight of the laminated windshield thus formed, it is advisable to select for the exterior or non-tempered lamina, a thin layer, for example on 0.6 to 2 mm. thick. The other and tempered lamina may be from 3 to 5 mm. thick. The interposed layer of polyvinyl butyral may have a thickness of from about 0.36 to 0.75 mm.

Figure 3:
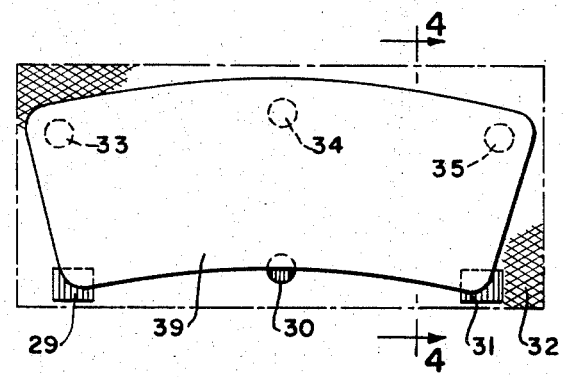
FIG. 3 is an elevational view of a form of apparatus for producing laminated glass sheets of which one lamina is tempered and the other is untempered.
Figures 4, 5:
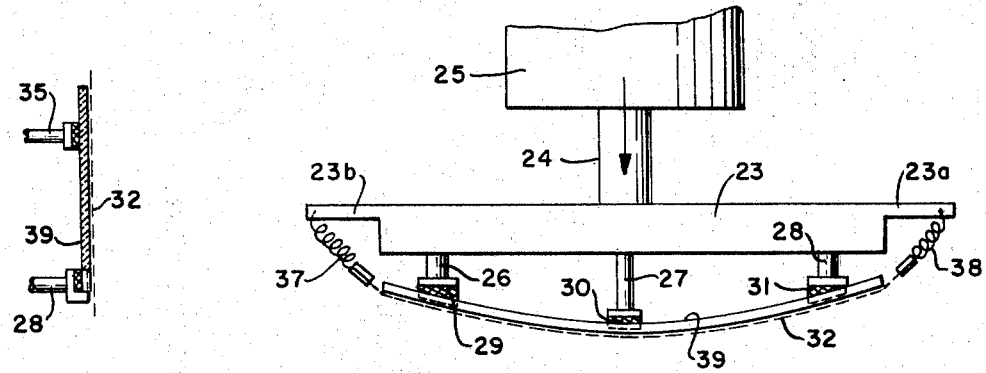
FIG. 4 is a section taken in a plane identified by line 4—4, FIG. 3.
FIG. 5 is a plan view of the apparatus shown upon FIG. 3.

FIGS. 3, 4 and 5 show an apparatus by which such laminated sheets of glass may be produced. A plate or frame 23 is fixed to the end of press plunger 24, of hydraulic press 25. Projections 26, 27, and 28, properly spaced for the size and shape of the article to be formed, extend from the lower portion of the frame and are tipped with rubber as indicated at 29, 30 and 31, respectively, to form protective abutments for the glass. It is noted that, as indicated upon FIG. 4, at least projections 26 and 28 are shaped to provide extensions supporting the lamina at and along its lower edge. Projections 33, 34 and 35 extend at spaced locations from plate 23 at and along the upper portion of the sheet or lamina, to form additional abutments.

In the construction under description, hydraulic or pneumatic cylinder 25 corresponds in function to item 18 of FIG. 1. A flexible sheet or hammock 32 of heat resisting fabric is carried by extensions 23a, 23b integral with plate 23, by attachment of its side edges to springs 37 and 38. The other ends of the springs are connected with the respective extensions. It will be understood that there may be a plurality of such springs each connected to a respective corner of the hammock, or at spaced points along reinforcement strips secured along the vertical or side edges of the hammock.

Thus, when a previously shaped and tempered glass lamina 39 is positioned against the rubber tips of projections 26, 27, 28, etc., and hammock 32 is located as shown at FIG. 5, springs 37, 38, etc. act to firmly hold the lamina in place against the projections.

In use of this form of the invention, a glass sheet 39 which, for example, is to form one lamina of an automobile windshield, is first shaped and tempered by known procedures, then located as shown at FIGS. 3 and 5, to be held in place by hammock 32 and springs 37, 38. Next, a plane sheet of glass of the same size and outline as lamina 39, is placed in a sack of glass fabric and the sack and sheet are heated to about 700° C. The sheet, supported within its sack, is then removed from the furnace and located between the shaped lamina or sheet 39 and a hammock which as previously noted may be like item 7, FIG. 1, and similarly mounted. The two hydraulic presses, only one of which, 25, is shown upon FIG. 5, are then energized to press the heated and softened lamina, still within its sack, against the shaped and tempered lamina 39. The hammock thus operated in an obvious way to conform the heated lamina perfectly to the shape of lamina 39 which operates as a platen.

The thin shaped lamina is removed with its sack from contact with lamina 39 and after cooling is taken from the sack. Lamina 39 is removed from its mounting and the two laminae are adhesively secured in surface contact, for example, by an interposed layer of polyvinyl butyral.

The windshield thus produced has the double advantage of functioning in case of an accident, in the same way as a single tempered pane 5 to 6 mm. thick, and also in event of shattering, the laminated sheet reduces the risk of diminution of visibility through the windshield.

It is of particular interest to note that when as a result of a blow or shock coming from the interior of the vehicle, the windshield is perforated, the untempered lamina because of its thinness and its strong adherence to the interposed layer of polyvinyl butyral, fragments into pieces as small as the tempered lamina so that there is thereby avoided the risk of serious wounds by cuts from the fragments of the perforated zone.

It is also possible and contemplated, to utilize the shaped and tempered lamina as a platen when it is desired to attach the untempered layer to the concave, rather than to the convex surface of the platen as, for instance, when the untempered lamina is to be on the interior rather than the exterior side of the completed laminated sheet.

As will be clear from the following examples, excellent results are attained where the sack is of glass fiber or of metal filaments. I have used with success a fabric woven of stainless steel 18/8. The filaments had a diameter of 0.03 mm. The mesh apertures of the fabric were about 0.075 mm. As a result of their good heat conducting ability, fabrics woven of metal filaments are especially useful in tempering, particularly of thin glass sheets.

Following are examples of the inventive method:

EXAMPLE 1

This relates in particular to FIG. 1. The glass sheets were 40 x 120 rectangles with thickness of bettween 0.8 and 1.0 mm. The sack was of glass fabric having a thickness of about 0.4 mm. and a weight of 598 g./m.$^2$. It was closed along its lower edge by a metal binding.

In the furnace each sheet was heated to about 700° C. during a period of about 1 min. 35 secs. On extraction from the furnace the sheet in its sack was positioned between a rigid platen having a horizontal deflection of about 80 mm., and a flexible shaping or pressing means. The rigid platen was a metal core encased in heat insulating material such as glass fabric or textile. The pressing means was a sheet or hammock of glass fabric having a thickness of about 0.4 mm., yieldingly mounted on a rigid frame by springs, as previously described. The platen and shaping means were forced together with interposed heated sheet and supporting sack, with a pressure of about 150 g./cm.$^2$, for a period of 1 min. The platen and shaping means were then separated, the sack and its enclosed sheet removed, and the cooled shaped sheet extracted from the sack.

EXAMPLE 2

This relates in particular to FIG. 2. In this example the glass sheets were 40 x 60 cm. rectangles with thickness of 1.1 to 1.2 mm. The fabric constituting the sack was of glass fiber and had a thickness of 0.09 mm. and a weight of 109 g./m.$^2$. The sheets were heated in the furnace at about 700° C. during a period of 1 min. 40 secs. Shaping was effected by pressing the hot sheet, within its sack, for a period of 10 secs., between two rigid complementary-shaped platens. The male platen had the form of a spherical protrusion of 20 mm. total deflection and a radius of 1.2 m.

EXAMPLE 3

This example relates to tempering. The sheets treated were rectangles of smooth polished glass 110 x 170 mm. in size and 5 mm. thick. The supporting sack was of silica fiber and had a thickness of about 0.27 mm. and a weight of 200 g./m.$^2$. In the furnace with temperature regulated to 700° C., each sheet was heated for a period of 1 min. 40 secs. On extraction from the furnace the sack, supporting its panel was positioned between two cooled rigid plane platens which were forced together, with sack and sheet interposed, with a pressure of the order of 300 g./cm.$^2$, for a period of 30 secs. The sheets thus tempered bore no observable markings from the fabric sack and the glass had a fragmentation which was exceptionally satisfactory.

EXAMPLE 4

The steps of Example 3 were repeated with a sack of glass fabric having a thickness of 0.16 mm. and a weight of 206 g./m.$^2$. The sheets were heated in the furnace at 700° C., for periods of from 2 min. 45 secs., to 3 min. The resulting sheets fragmented in an exceptionally fine and homogeneous manner.

EXAMPLE 5

The specimens used were rectangular glass panes 110 x 170 mm. and 2 mm. thick. The sack was a sheet of glase fabric having a thickness of 0.03 mm. and a weight of 38 g./m.$^2$. The furnace was regulated to 660° C. and the heating period was 3 min. 45 secs. Despite the thinness and low specimens, it was observed that the panes thus tempered, as in Example 3, afforded a fragmentation which was very fine and perfectly satisfactory, of about 200 pieces for each area of 25 cm.$^2$.

EXAMPLE 6

This example relates to combined shaping and tempering. The cooled platens used were of complemental spherical surface form with radius of 1.2 m. and total radical deflection of 20 mm., that is, 420 mm. chordal distance. The specimens were rectangular polished glass sheets 40 x 60 cm. and 3 mm. thick. The sack was glass fabric having a thickness of 0.09 mm. and a weight of 109 g./m.² The furnace temperature was controlled at 700° C. and the time of heating of each sheet within the furnace, was 4 min. 45 secs. On withdrawal from the furnace each sheet was pressed between platens as aforesaid, with a pressure of 300 g./cm.². The shaped and tempered specimens were of very regular and accurate form and fragmented into pieces which were regular and homogenous in size, of about 200 pieces for each area of 25 cm.²

EXAMPLE 7

This example illustrates the formation as in FIGS. 3, 4 and 5, of a laminated glass windshield.

First, there is shaped in the usual way, a rectangular glass sheet of lamina 48 x 123 cm. and 5 mm. thick. The shaped lamina was curved to have a maximum deflection in its longest dimension, of 80 mm., and in its shorter dimension a maximum deflection of 4 mm. The lamina thus shaped was then treated to impart to it the usual or acceptable tempering, that is, one wherein fragmentation is in 60 to 200 pieces for each area 5 cm.².

The sheet thus shaped and tempered was fixed in vertical position upon a support, for use as a rigid platen as shown at FIGS. 3, 4 and 5, so that it was held firmly by hammock 32. The second lamina in the form of a plane thin glass sheet of the same size, namely, 48 x 123 cm., and 1.5 mm. thick, was placed in a sack of glass fabric 0.4 mm. thick and having a weight of 598 g./m.².

The sack and its contained lamina were lowered into the furnace heated to 700° C. and kept there for 2 min., then elevated out and accurately located between the shaped and tempered lamina 39, serving as a platen, and a hammock such as 7, FIG. 1, yieldingly stretched and mounted as there shown. Hammock 7 was glass fabric 0.16 mm. thick and having a weight of 206 g./m.².

The two presses were then simultaneously energized to press the hot plastic lamina between lamina 39 and hammock 7. The latter, being yieldingly mounted, acted as a female platen or mold and forced the hot sheet or lamina into full surface conformation with lamina 39. The period for this operation was 10 sec.

The presses were then reversed to separate the parts, the shaped and untempered lamina was removed, cooled and taken out of its sack. The previously shaped lamina 39 was taken from its mounting and the two complementally-shaped laminae were secured together in superposed registration, by an interposed layer of polyvinyl butyral having a thickness of 0.75 mm.

EXAMPLE 8

This example relates to tempering. The rectangular sheets treated were of polished glass 40 x 60 cm. in size, and 2 mm. thick. The sack supporting the glass sheet was a fabric of stainless steel filaments 0.03 mm. in diameter. The thickness of the fabric was 0.06 mm. The temperature of the furnace was 700° C. and the duration of heating of the sheet within its sack was 2 min. 10 sec. On extraction from the furnace the sack and its sheet thereby supported were placed between two cooled rigid planar platens which were forced together with a pressure of from 200 to 250 g./cm.². The pressure was maintained for about 20 sec. The resulting tempered sheets had excellent fragmentation of about 300 pieces for each area 5 cm. square.

EXAMPLE 9

Example 8 was repeated in all respects except that the cooled platens were of complementally curved form rather than planar. The resulting sheets displayed the same excellent tempering as in Example 8.

As many apparently widely different embodiments of the present invention may be made without departing from the spirit and scope thereof, it is to be understood that the invention is not limited to the specific embodiments.

What is claimed is:

1. Apparatus for the pressing and shaping of a sheet of glass, comprising, a universally flexible sack formed essentially of fibers of refractory material, constructed and arranged to receive, enclose and support a sheet of glass to be pressed and shaped, supporting means to engage and freely suspend the sack at and from its upper edge with a sheet of glass freely vertically disposed within said sack, cooperating first and second pressing and shaping means for the sheet in the sack so suspended, and disposed on respective sides thereof, said sack having visible indicia fixed thereon whereby the sheet may be accurately located by visual comparison of said indicia with respect to one of said first and second pressing and shaping means, and means operable to force said first and second pressing and shaping means together with the sheet and said suspending sack interposed therebetween, to thereby press and shape the sheet.

References Cited
UNITED STATES PATENTS

| | | | |
|---|---|---|---|
| 2,146,390 | 2/1939 | White | 65—114 |
| 2,239,546 | 4/1941 | Black et al. | 65—106 |
| 2,263,005 | 11/1941 | McClure | 65—106 UX |
| 3,220,818 | 11/1965 | Barca et al. | 65—106 |
| 3,220,817 | 11/1965 | Malobicky et al. | 65—106 X |
| 3,310,273 | 3/1967 | Seymour | 65—287 X |
| 3,600,150 | 8/1971 | Rougeux | 65—287 X |

FRANK W. MIGA, Primary Examiner

U.S. Cl. X.R.
65—169, 287, 289

UNITED STATES PATENT OFFICE
CERTIFICATE OF CORRECTION

Patent No. 3,806,330   Dated April 23, 1974

Inventor(s) Michel Martin

It is certified that error appears in the above-identified patent and that said Letters Patent are hereby corrected as shown below:

Column 3, line 62, for "be" substitute --by--.
Column 4, line 21, for "of" (first occurrence) substitute --or--.
Column 5, line 33, for "pressure" substitute --presses--.
Column 6, line 3, for "of" (first occurrence) substitute --or--;
line 4, for "whenthe" substitute --when the--;
line 5, for "conjoint" substitute --conjointly--;
line 30, for "laminate" substitute --laminae--.
Column 8, line 4, for "bettween" substitute --between--;
line 66, for "glase" substitute --glass--.
Column 9, line 19, for "of" substitute --or--.

Signed and sealed this 8th day of October 1974.

(SEAL)
Attest:

McCOY M. GIBSON JR.
Attesting Officer

C. MARSHALL DANN
Commissioner of Patents